No. 766,314. PATENTED AUG. 2, 1904.
F. W. YOST & W. C. CONANT.
POWER TRANSMITTER.
APPLICATION FILED AUG. 17, 1901.
NO MODEL.
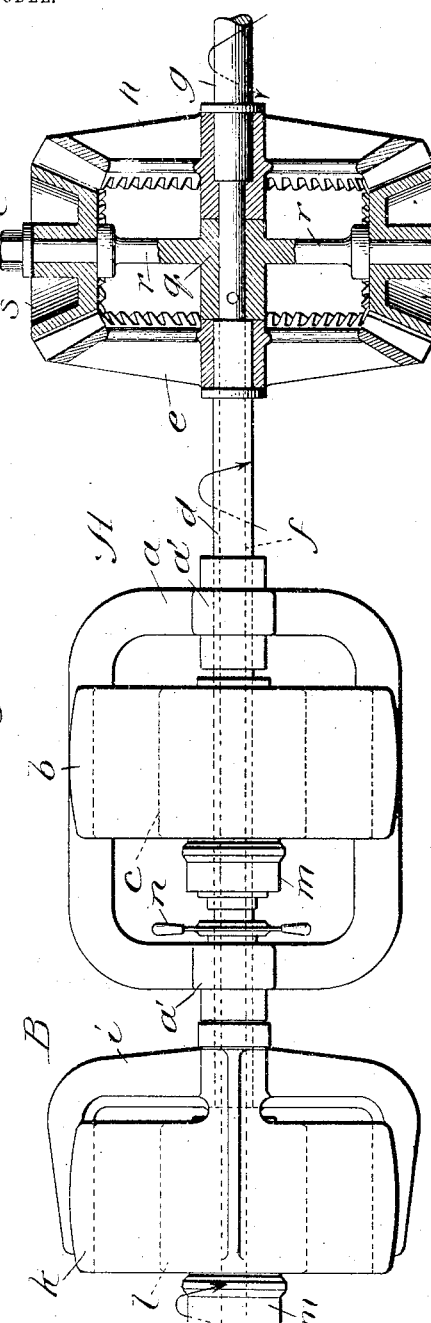
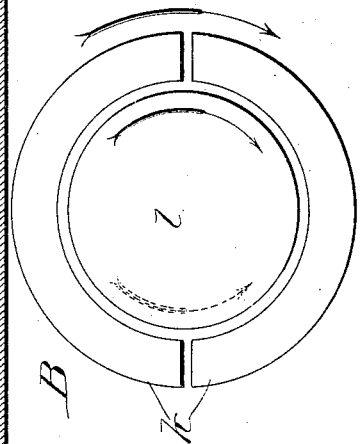
Witnesses:
Inventors:
Frederick W. Yost,
William C. Conant, No. 766,314.

Patented August 2, 1904.

UNITED STATES PATENT OFFICE.

FREDERICK W. YOST, OF CHICAGO, ILLINOIS, AND WILLIAM C. CONANT, OF ATLANTA, GEORGIA.

POWER-TRANSMITTER.

SPECIFICATION forming part of Letters Patent No. 766,314, dated August 2, 1904.

Application filed August 17, 1901. Serial No. 72,421. (No model.)

*To all whom it may concern:*

Be it known that we, FREDERICK W. YOST, residing at Chicago, in the county of Cook and State of Illinois, and WILLIAM C. CONANT, residing at Atlanta, in the county of Fulton and State of Georgia, citizens of the United States, have invented a new and useful Improvement in Power-Transmitters, of which the following is a specification.

Our invention relates to improvements in power-transmitting mechanism for use more especially where it is desired that the prime mover shall when in operation work constantly as far as possible at its maximum efficiency of speed, and therefore with the greatest economy, under varying conditions of the load or resistance against which it may be caused to operate.

According to this invention, which is advantageous for use with elevators, automobiles, and numerous other applications, there is interposed between the prime mover and a shaft or the like to be driven a power-transmitting gear subject to the control of a second motor device, whereby its rotation with relation to the prime mover and also to the driven shaft may be varied to transmit to the latter any desired speed between *nil* and a maximum at will.

Our invention is especially desirable for use where the prime mover is a gas-engine or electric motor and where the driven shaft or the like is to be started and stopped at frequent intervals and also reversed and is to be run at different speeds and under varying changes as regards load.

For purposes of illustration and because it is especially desirable for use in connection with electrically-operated elevators or hoists generally we show and describe our invention in connection with a shaft to be driven and rotated in either direction, the prime mover and transmitting-gear controller being electric motors.

In the drawings, Figure 1 is a broken plan view of mechanism constructed according to our invention with the transmitting and attendant gear-wheels in section; Fig. 2, a broken and partly-sectional view of the shafts and sleeve on which the moving parts of the device are mounted, and Fig. 3 an end view in the nature of a diagram of the transmitting-gear-controlling motor.

A is an electric motor forming what we term the "prime mover." It is mounted in a frame $a$, with a stationary field $b$ and revolving armature $c$ keyed to a sleeve $d$, which extends through bearings $a'$ $a'$ in the frame $a$. Keyed to the sleeve $d$ at one end is a bevel gear-wheel $e$. Extending through and beyond opposite ends of the sleeve $d$ is a shaft $f$, which at one end abuts loosely against a shaft $g$. Keyed to the shaft $g$ is a bevel gear-wheel $h$, constructed like the wheel $e$.

B is an electric motor constituting the transmitting-gear controller. The motor B has a frame $i$ fixed at its center upon the end of the sleeve $d$. The frame supports the field $k$, which revolves with the sleeve $d$. Within the field $k$ is the armature $l$, which is fixed upon the shaft $f$.

$m$ $m$ are the commutators, carried by the armatures of the motors, and $n$ $n$ are brush-holders carried upon fixed supports, such as the bearing $a'$ and a bearing $p$ for the end of the shaft $f$. Mounted upon the end of the shaft $f$ between the gears $e$ $h$ is a power-transmitting gear C, comprising a hub $q$, with radial arms $r$, on which are journaled bevel-pinions $s$, meshing at their opposite sides, respectively, with the gears $e$ and $h$.

The prime mover or motor A may run constantly at its maximum efficiency, whereby the armature $c$ rotates at an approximately fixed speed. This rotation of the armature causes the sleeve $d$, gear $e$, and field $k$ of the motor B to be rotated at the same speed. The rotation of the gear-wheel $e$ rotates the pinions $s$ upon their individual axes against the gear-wheel $h$. When the transmitting-gear C is not under any operative influence from the motor B, turning of the gear $e$ will cause the pinions $s$ to rotate on their axes and run freely around the gear-wheel $h$. The revolution of the transmitting-gears will turn the shaft $f$ and armature $l$ in the same direction as the sleeve $d$, but at slower speed. If the resistance or load upon the shaft $g$ is greater than the friction of parts between the wheel $h$ and bearing $p$, the gear $h$ and its shaft $g$ will stand still.

Assuming for purposes of illustration that the motor A, working at its normal maximum efficient speed, rotates the sleeve $d$ and field $k$ at the rate of fifteen hundred revolutions per minute and that the gear $h$, being at a standstill, causes the shaft $f$ and armature $l$ to be rotated in the same direction as the field $k$ at a speed of seven hundred and fifty revolutions per minute, a current of electricity turned into the motor B will under suitable arrangements of the mechanism tend to cause the armature $l$ to rotate either slower or faster with relation to the field $k$. If it is caused to rotate more slowly, it reacts in the direction of the dotted arrow in Fig. 3 against the rotating field, causing the transmitting-gear C to move at relatively slower speed or drag upon the gear $e$ and exert power commensurate with the force of the drag against the gear $h$ to rotate it and the shaft $g$ in the direction of the arrow. (Shown at said shaft in Fig. 1.) The power thus applied to rotate the shaft $g$ is a power which will gradually and without jar upon the prime mover start said shaft and speed it up to the maximum which the force of the drag is capable of transmitting thereto. The force of the drag is thus in approximately direct ratio to the strength of current applied to the motor B. To rotate the shaft $g$ in the opposite direction to that above stated, the electric current may be applied to the motor B to speed up the armature $l$ (in the direction of the arrow shown in full lines in Fig. 3) with relation to the field $k$, whereby the reaction at the said motor is reversed and the drag between the driving-member gear $e$ and the transmitting-gear is caused by the relative lagging of the wheel $e$, thereby exerting rotation in the contrary direction to that before stated against the driven-member gear $h$.

The prime mover A may be any suitable form of motor, or it may be a shaft, pulley, or other rotating power device driven from an engine or the like, and the motor B may be any suitable power device, whether electrically actuated or otherwise, which will operate as above defined.

Our invention is not limited to the particular form and arrangement of toothed gears shown and described, since these may be modified in construction to suit particular or different conditions, and while for convenience we have shown an electric transmitting-gear-controlling motor in which the field is connected with the prime mover and the armature with the transmitting-gear this arrangement may be reversed. The only necessary requirement is that the prime mover and transmitting-gear shall be connected, respectively, with the active and reactive members, or vice versa, of the controlling-motor.

While we show a desirable structural embodiment of our improvement, it will be obvious that the construction may be variously modified as to details without departing from the spirit of our invention as defined by the claims.

What we claim as new, and desire to secure by Letters Patent, is—

1. In a power-transmitting device, the combination with a driving-member gear and a driven-member gear, of a power-transmitting gear interposed between them, and a controlling-motor for the transmitting-gear having movable active and reactive members connected respectively with the said driving-member and transmitting gears, substantially as set forth.

2. In a power-transmitting device, the combination with a driving-member gear and a driven-member gear of a power-transmitting gear interposed between them and an electric controlling-motor for the transmitting-gear having movable active and reactive members connected respectively with the said driving-member and transmitting gears, substantially as set forth.

3. The combination with a prime mover and a driven member of a power-transmitting gear interposed between them, and a controlling-motor for the transmitting-gear having movable active and reactive members operatively connected respectively with the said prime mover and transmitting-gear, substantially as set forth.

4. The combination with a prime mover and a driven member of a power-transmitting gear interposed between them and an electric controlling-motor for the transmitting-gear having its movable active and reactive members operatively connected respectively with the said prime mover and transmitting-gear, substantially as set forth.

5. The combination with a prime mover and a driven member of a power-transmitting gear interposed between them, and an electric controlling-motor for the transmitting-gear having a rotating field operatively connected with the prime mover and a rotating armature operatively connected with the said transmitting-gear, substantially as and for the purpose set forth.

FREDERICK W. YOST.
WILLIAM C. CONANT.

In presence of—
D. W. LEE,
W. B. DAVIES.